(12) United States Patent
Moore

(10) Patent No.: US 11,003,468 B2
(45) Date of Patent: May 11, 2021

(54) PRELOADING OF APPLICATION ON A USER DEVICE BASED ON CONTENT RECEIVED BY THE USER DEVICE

(71) Applicant: Citrix Systems, Inc., Fort Lauderdale, FL (US)

(72) Inventor: Timothy Moore, Boynton Beach, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 7 days.

(21) Appl. No.: 16/182,734

(22) Filed: Nov. 7, 2018

(65) Prior Publication Data
US 2020/0142715 A1    May 7, 2020

(51) Int. Cl.
*G06F 9/451*    (2018.01)
*G06F 3/0481*    (2013.01)
*G06F 3/0484*    (2013.01)

(52) U.S. Cl.
CPC .......... *G06F 9/451* (2018.02); *G06F 3/04817* (2013.01); *G06F 3/04842* (2013.01)

(58) Field of Classification Search
CPC ... G06F 9/451; G06F 3/04817; G06F 3/04842
See application file for complete search history.

(56) References Cited

U.S. PATENT DOCUMENTS

| | | | | |
|---|---|---|---|---|
| 6,546,554 B1* | 4/2003 | Schmidt | ............. | G06F 9/44526 709/201 |
| 6,757,716 B1* | 6/2004 | Blegen | ................. | G06Q 20/108 709/217 |
| 6,772,139 B1* | 8/2004 | Smith, III | ............. | G06F 16/951 707/748 |
| 8,819,123 B1* | 8/2014 | Veen | ..................... | G06F 3/0481 709/203 |
| 8,850,301 B1* | 9/2014 | Rose | ..................... | G06F 40/134 715/208 |
| 9,607,332 B1* | 3/2017 | Nazarov | ............ | G06Q 30/0641 |
| 9,684,688 B2* | 6/2017 | Ferguson | ............ | G06F 16/2379 |
| 9,832,619 B2 | 11/2017 | Cho | | |
| 2002/0083093 A1* | 6/2002 | Goodisman | ......... | G06F 16/9535 715/255 |

(Continued)

OTHER PUBLICATIONS

Takada, "Single page apps in depth," Jul. 1, 2012, https://web.archive.org/web/20120701021821/http://singlepageappbook.com/single-page.html.*

*Primary Examiner* — Ryan Barrett
(74) *Attorney, Agent, or Firm* — Banner & Witcoff, Ltd.

(57) ABSTRACT

Methods, systems, computer-readable media, and apparatuses for performing tasks based on receiving content. When the content is received, it is determined whether the content meets one or more criteria. A determination is made that the content has been opened. If the content meets a criteria and has been opened, the content is analyzed to determine if the content matches information included in at least one of a plurality of data entries stored in a database, wherein each data entry includes an application type and data associated with the application type. In response to determining that the content contains information associated with the application type, a user interface element is provided on a display, whereby the user interface element enables the user to open, via a user operation on the display, the application type associated with the one of the plurality of data entries.

23 Claims, 8 Drawing Sheets

(56) References Cited

U.S. PATENT DOCUMENTS

| | | | |
|---|---|---|---|
| 2007/0033214 A1* | 2/2007 | Lewis | G06F 3/04817 |
| 2011/0197115 A1* | 8/2011 | Gorelick | G06F 16/9558 |
| | | | 715/205 |
| 2011/0209064 A1* | 8/2011 | Jorgensen | G06F 9/54 |
| | | | 715/733 |
| 2011/0314389 A1* | 12/2011 | Meredith | G06F 8/60 |
| | | | 715/751 |
| 2012/0296959 A1* | 11/2012 | Momchilov | G06F 9/54 |
| | | | 709/203 |
| 2012/0297041 A1* | 11/2012 | Momchilov | G06F 9/4451 |
| | | | 709/223 |
| 2013/0212484 A1* | 8/2013 | Joshi | G06F 9/541 |
| | | | 715/740 |
| 2014/0157173 A1* | 6/2014 | Takayama | G06F 9/44505 |
| | | | 715/771 |
| 2015/0281150 A1* | 10/2015 | Masterson | G06F 16/22 |
| | | | 715/752 |
| 2015/0347357 A1* | 12/2015 | Maughan | H04L 51/04 |
| | | | 715/205 |
| 2016/0308940 A1* | 10/2016 | Procopio | G06F 16/1734 |
| 2016/0313882 A1* | 10/2016 | Brown | H04L 67/06 |
| 2018/0075136 A1* | 3/2018 | Ko | G06F 16/338 |
| 2018/0365051 A1* | 12/2018 | Radhakrishnan | G06F 9/4856 |
| 2019/0251188 A1* | 8/2019 | Luo | H04L 67/06 |

* cited by examiner

| User Application Library | |
|---|---|
| Field 1 | Field 2 |
| EXCEL | Finance or Financial |
| PYTHON | Data or Database |
| VISIO | Plot or Graph |

600 →
610 — EXCEL
620 — PYTHON
630 — VISIO

*FIG. 6*

PRELOADING OF APPLICATION ON A USER DEVICE BASED ON CONTENT RECEIVED BY THE USER DEVICE

FIELD

Aspects described herein generally relate to computer hardware and software. In particular, one or more aspects of the disclosure generally relate to preloading of an application on a user device based on content received by the user device.

BACKGROUND

Studies show that a greater percentage of persons are working from their homes at least one day a week, as opposed to working only at their company's facilities. This is due to many reasons, including longer commute times, limited office space at company facilities, and improved technology capabilities (e.g., improved virtualization systems, faster Internet speeds), for example.

One way to make a person's work experience at their home as close as possible to a work experience at that person's company facility workspace is the use of "virtualization". Virtualization is a way in which a user's home computer has access to the same files and applications that the user has access to when operating his/her work computer at the company facility where the user normally does his/her work.

Citrix Systems, Inc. of Ft. Lauderdale, Fla. (hereinafter referred to as "Citrix" or "Citrix Systems, Inc."), provides several products that establish a virtual computer environment for a person working at home or at some location away from the company facility workspace where that person normally works. One such Citrix product that enables a user to work efficiently from his/her home is XenDesktop, which is an application that a user may install on his/her home computer, desktop or smart phone, and which enables the user to access all of the applications and files that the user can access on a computer at his/her company facility workspace. The applications that the user may access on the user's home device are stored on a computer located in a data center or other secure computer location, for example, whereby the user has access to those applications without those applications being physically stored on the user's home device. As such, the user's home device operates as a virtual machine, which mimics the look and feel of the user's computer located at the user's company facility workspace.

Another such Citrix product that enables a user to work efficiently from his/her home is XenMobile, which is an application that a user may install on his/her smart phone or tablet computer, and which provides mobile device management (MDM) and mobile application management (MDM) of the user's smart phone or tablet computer by an Information Technology (IT) administrator of the company that the user works for. For example, if a user happens to lose her smart phone or have it stolen, the XenMobile application, upon notification by the user that her smart phone is missing, may wipe clean all of the company-related information on the user's smart phone, to thereby protect any company proprietary information that may be stored on the lost or stolen smart phone.

A further Citrix product that enables a user to work efficiently from his/her home is Citrix Cloud, which provides for a way that a user can store information separate from her home computer memory. That information is stored in the "Cloud", which may be memory located in a secure data center accessible via the Internet, via a Wide Area Network (WAN), or via a Local Area Network (LAN). Access to and from the Cloud may be via secure network communication paths, whereby data that is securely stored in the Cloud is securely transferred between the Cloud and the user device. Put in another way, Citrix Cloud may be used to enable virtualization as a service (VaaS).

When a user is working at home on her home desktop, the user may receive emails or text messages related to projects that the user is tasked to perform.

There is a need to provide for a way to assist the user in performing tasks when the user is working from home.

SUMMARY

Aspects of the disclosure relate to various systems and techniques that provide for a method and apparatus that detect receipt of content by a user device, and that analyze the content to determine if there is any information within the content that may be used to preload, to the user device, an application that is associated with the information.

At least one aspect is directed to a method that comprises determining that content has been received by a user device. The method also includes determining whether the content meets one or more criteria. The method further includes determining that the content has been opened on the user device. The method still further includes analyzing, when the content meets the least one or more criteria and has been opened on the user device, the content to determine if the content matches information included in at least one of a plurality of data entries stored in a database, wherein each data entry includes an application type and data associated with the application type. The method also includes, in response to determining that the content matches the information included in at least one of the plurality of data entries stored in the database, providing, on a display of the user device, a user interface element that enables a user to open, via an operation made by the user on the display of the user device, the application type associated with the one of the plurality of data entries.

At least one aspect is directed to an apparatus that includes one or more processors. The apparatus also includes a memory storing instructions that, when executed by the one or more processors, cause the apparatus to determine that content has been received by the apparatus. The instructions also cause the apparatus to determine whether the content meets at least one or more criteria. The instructions further cause the apparatus to determine that the content has been opened on the apparatus. The content still further cause the apparatus to analyze, when the content meets the least one or more criteria and has been opened on the apparatus, the content to determine if the content matches information included in at least one of a plurality of data entries stored in a database, wherein each data entry includes an application type and data associated with the application type. The instructions also cause the apparatus to, in response to determining that the content matches the information included in at least one of the plurality of data entries stored in the database, provide, on a display of the apparatus, a user interface element that enables a user to open, via an operation made by the user on the display of the apparatus, the application type associated with the one of the plurality of data entries.

At least one aspect is directed to a system comprising a first apparatus and a second apparatus. The first apparatus comprises one or more processors. The first apparatus also comprises a memory storing instructions that, when executed by the one or more processors, cause the first apparatus to determine that content has been received by the first apparatus. The instructions further cause the first apparatus to determine whether the content meets at least one or more criteria. The instructions still further cause the first apparatus to determine that the content has been opened on the first apparatus. The apparatus also causes the first apparatus to analyze, when the content meets the least one or more criteria and has been opened on the first apparatus, the content to determine if the content matches information included in at least one of a plurality of data entries stored in a database, wherein each data entry includes an application type and data associated with the application type. The instructions also causes the first apparatus to, in response to determining that the content matches at least one of the plurality of data entries stored in the database, providing, on a display of the first apparatus, a user interface element that enables a user to open, via an operation made by the user on the display of the first apparatus, the application type associated with the one of the plurality of data entries. The application corresponding to the application type associated with the at least one of the plurality of data entries is accessible by the first apparatus operating as a virtual machine executing the application stored at the second apparatus.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts a user application library that includes entries each having an application field and a key word field, in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards detecting receipt of content by a user device, and for analyzing the content to determine if there is any information within the content that may be used to preload, to the user device, an application that is associated with the information.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
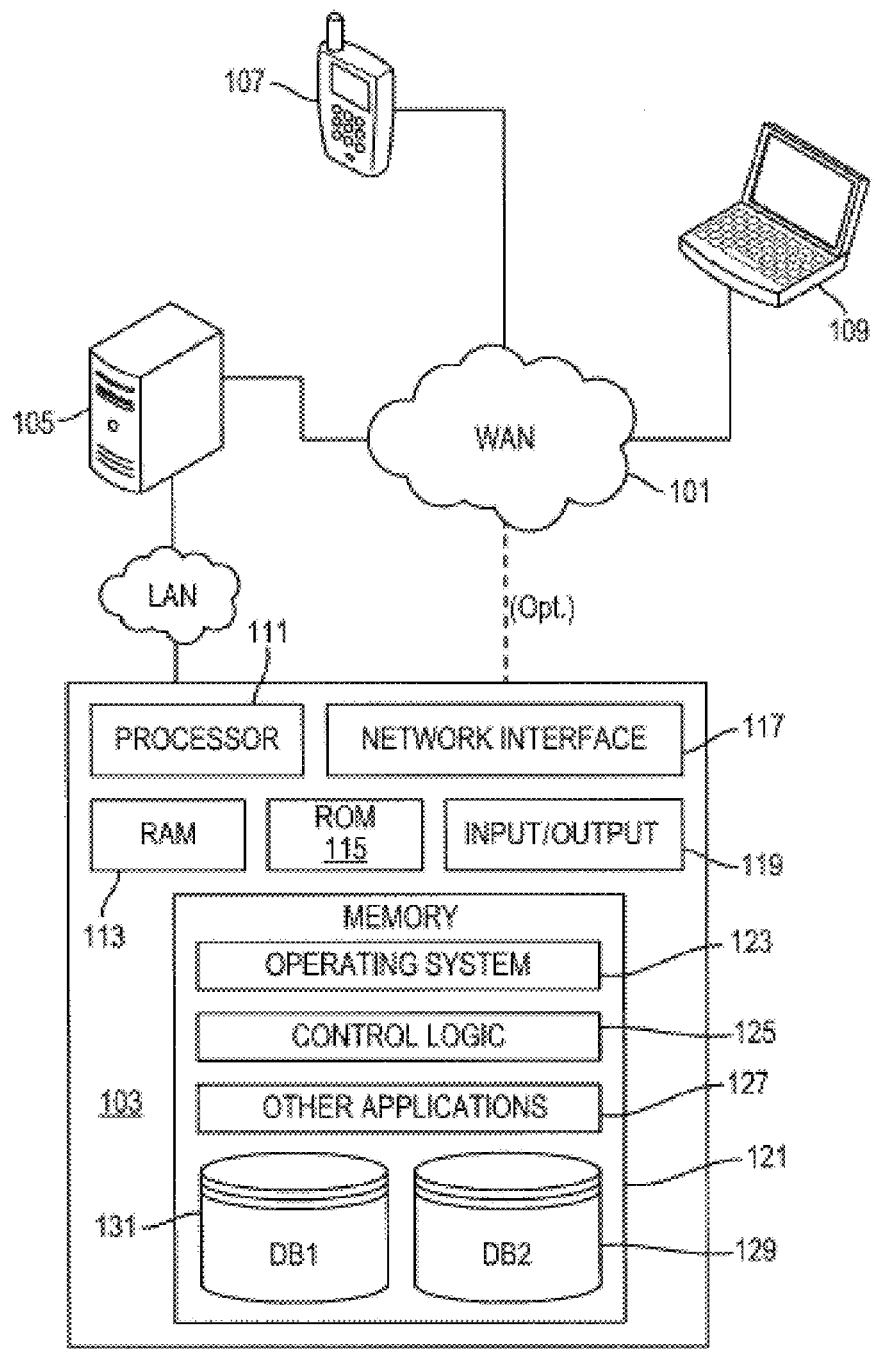
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database DB1 and a second database DB2. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
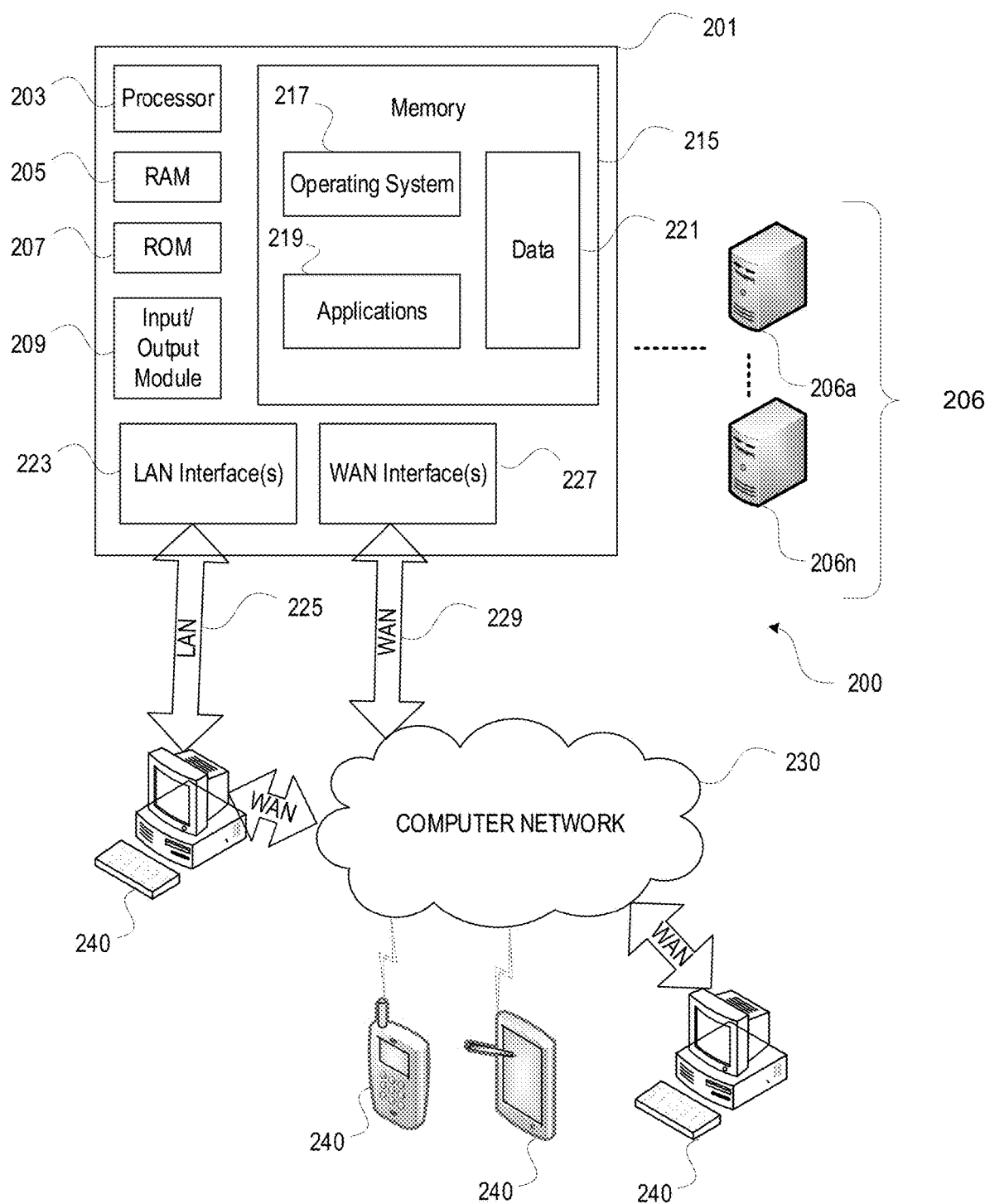
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc., or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) or Transport Layer Security (TLS) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
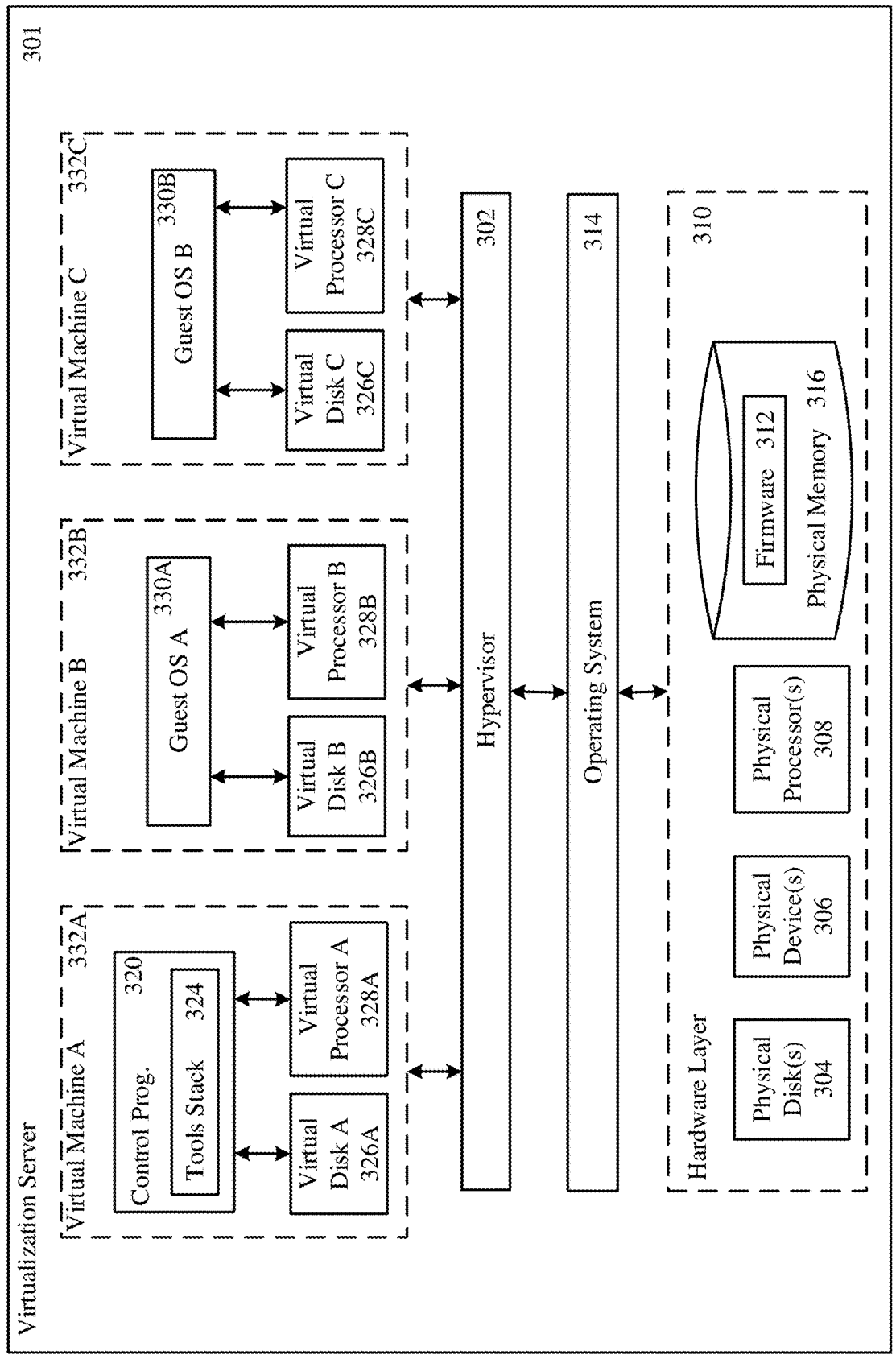
FIG. 3 depicts an illustrative virtualization (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
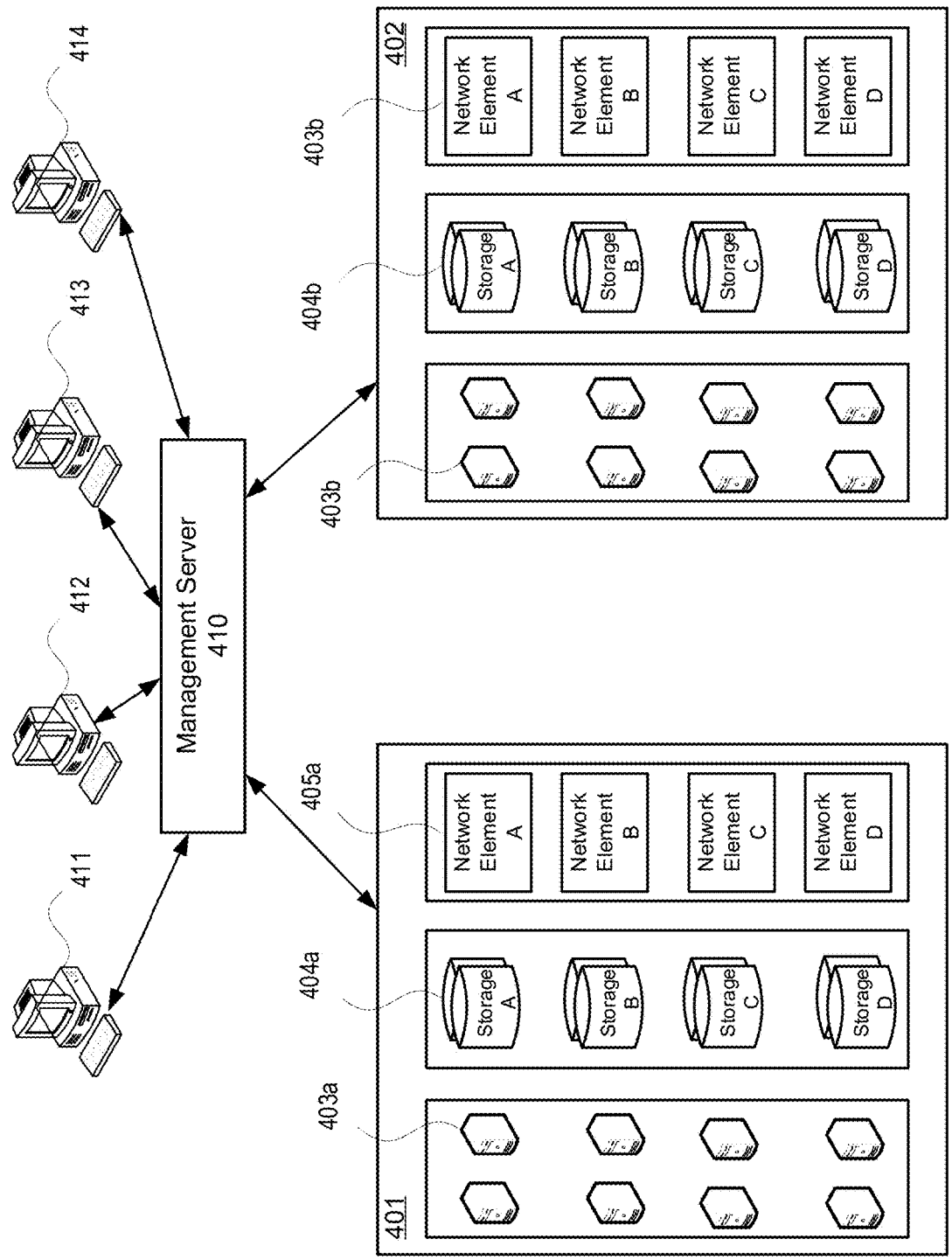
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

A number of embodiments will now be discussed in greater detail. In particular, and as introduced above, some aspects of the disclosure generally relate to detecting receipt of content by a user device, and for analyzing the content to determine if there is any information within the content that may be used to preload, to the user device, an application that is associated with the information.

As explained previously, there are several software products to assist a user working from his/her home to be able to performs tasks as efficiently as if the user was working at his/her office workspace. Those software products include Citrix Cloud, XenMobile, and XenDesktop, all provided by Citrix. According to one or more aspects, Citrix Cloud may be used as a mechanism that links the XenMobile application and the XenDesktop application, to enable a user to efficiently perform a task associated with information in content received by the user's home device (e.g., the user's home PC, the user's home desktop computer, or the user's smart phone). In more detail, information received by the user's home device, e.g., information within an email, or a text message, a video image, or any other received content, is compared to information stored in a database of content, e.g., keywords, images, data file fingerprints, etc., and applications associated with each, to determine if there are any matches, and if so, to provide a user interface element, such as a link or icon provided on a display of the user's home device. The user interface element provides the mechanism for the user to quickly launch a pre-loaded application and start performing a task described in or associated with the received content.

Figure 5:
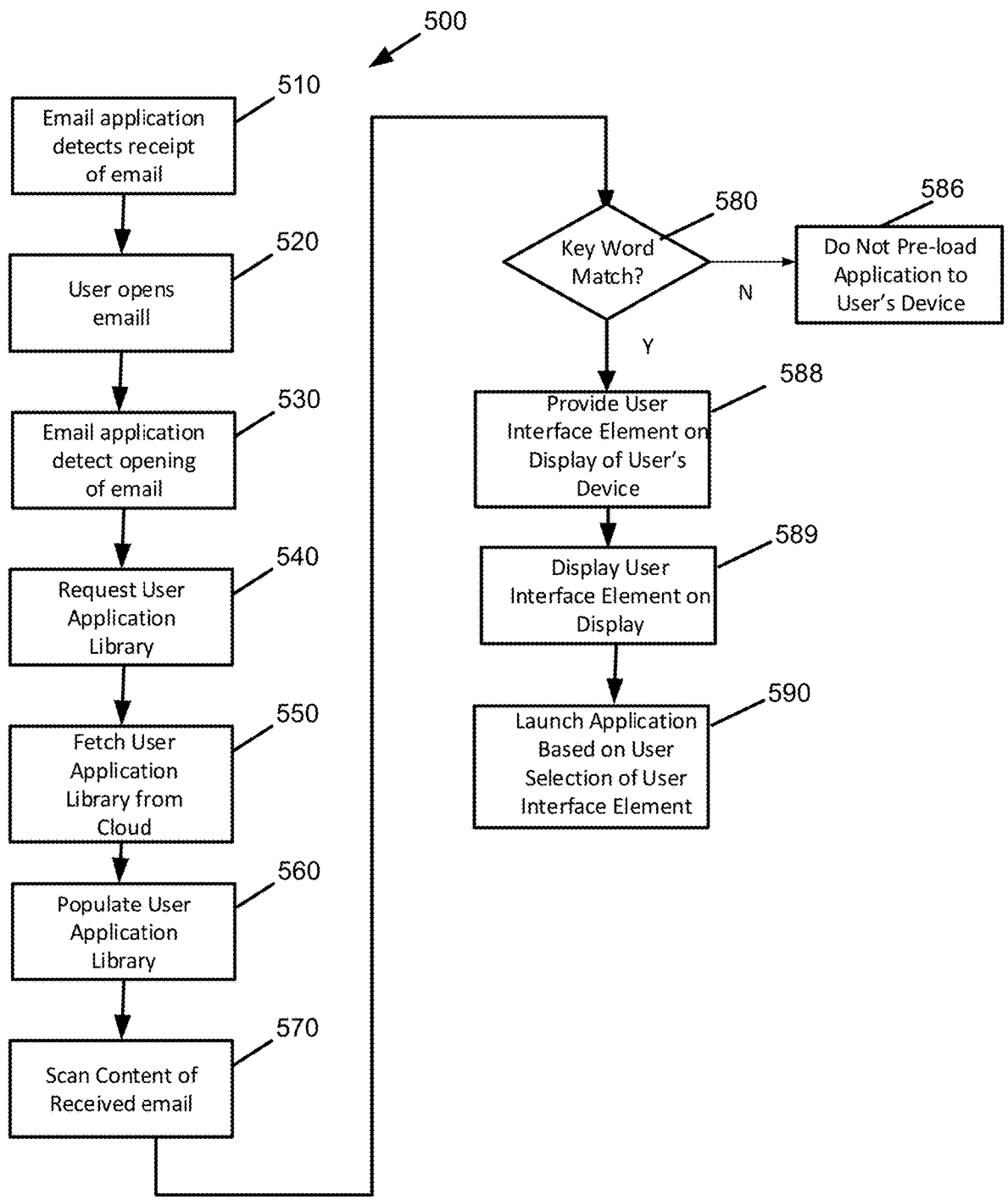
FIG. 5 depicts a flow diagram that illustrates a method that preloads an application to a user device based on information analyzed from content corresponding to a received email in a virtualization environment, in accordance with one or more illustrative aspects described herein.

FIG. 5 is described below with respect to the content being an email, but in alternative implementations, the content may be a text message or a video image, or any other received content, while remaining within the scope of the disclosure described herein.

With reference to the flow diagram 500 shown in FIG. 5 and the user application library 600 shown in FIG. 6, in step 510, an application on the user's home device detects receipt of an email. The email detection application may be XenMobile, which has the capability of detecting receipt of emails to determine if any of the received emails are potentially harmful to the user's home device. For example, the XenMobile application has an email security feature that may determine that a received email has an attachment that may contain a virus when opened, or that the received email is from a sender address that is associated with spam or other harmful content. Additionally, the XenMobile application has an email synchronization feature that periodically accesses an email server to determine which emails received by the email server are to be directed to the user's home device. The email synchronization feature may perform this function by checking the email server via Citrix Cloud periodically (e.g., every sixty seconds) for emails with a receive address matching the receive address of the user's home device. The email server may be provided at a secure data center or other secure location (e.g., within the company facility), for example.

If the email is determined to be "safe" by the XenMobile application, the user is allowed to open the email. An email may be made "safe" by removing any suspicious attachments (e.g., attachments having a '.exe' designation) to the email, for example. In step 520, the user opens the email.

In step 530, the email application (e.g., XenMobile), detects the opening of the email, and notifies the virtualization application (e.g., XenDesktop) to retrieve the user application library. As explained earlier, the XenDesktop application enables a user to open up an application that the user may access from his/her work computer at the user's work location, whereby the XenDesktop application allows the user to access the same applications from his/her home PC, home desktop, or smart phone using a virtualization system. In some aspects, only received emails that match a particular criteria cause the virtualization application to retrieve the user application library. For example, the particular criteria may be emails sent from persons working with the same company as the user (e.g., if the user's email address is tsmith@citrix.com, the criteria may be any received emails sent from *@citrix.com, where '*' signifies any prefix), or emails sent from persons on a white list of senders. Other emails that are not sent from the same company as the user or that are not sent from a person on a white list may not result in retrieval of a user application library, and thus those emails may not be additionally analyzed to determine whether content within those emails matches information stored in a user application library.

In step 540, upon notification by the XenMobile application to the XenDesktop application of an opening of an email received by a user's home device, the XenDesktop application sends a request for the user application library, which has entries for each application stored in a computer of a virtualization system (i.e., a server located at a secure data center) that a user may access from his/her home device. This request may be sent via Citrix Cloud, or by another type of communications network that connects the user's home device with another device where the user application library is stored. In some embodiments, the communications between the XenDesktop application and the XenMobile application may be accomplished via the Cloud, such as via Citrix Cloud, Microsoft Azure, or Amazon Web Services (AWS). In other embodiments, the XenMobile application and the XenDesktop application may communicate with each other via an internal bus on the user's home device, in cases when those applications are aware of each other's presence on the user's home device and may directly communicate with each other using the resources of the user's home device.

In step 550, the XenDesktop application obtains the user application library via the Cloud. The user application library may be stored in a computer located within a data center separate from the user's home device and separate from a computer of a virtualization system by which the user's home device may access one or more applications that the user is capable of accessing on the user's work computer.

In step 560, the user application library is populated with at least one entry, with each entry including a first field that includes an application name that the user is capable of retrieving using the XenDesktop application, and a second field that includes one or more key words associated with the application in the first field.

Turning now to FIG. 6, there is shown a representative user application library 600, which includes three entries 610, 620, 630. The first entry 610 includes "EXCEL" in the first field, and "finance" or "financial" as keywords associated with the "EXCEL" application in the second field. The second entry 620 includes "PYTHON" in the first field, and "data" or "database" in the second field. The third entry 630 includes "VISIO" in the third field, and "plot" or "graph" in the third field.

The applications listed in the first field of the three entries 610, 620, 630 in FIG. 6 correspond to the three applications that the user has been given prior authorization to access via the XenDesktop application on the user's home device, and the keywords listed in the second field of the three entries 610, 620, 630 in FIG. 6 correspond to words associated with tasks that the user has performed in the past using those respective applications. For example, if the user has recently performed a financial analysis of a project using EXCEL, then the key words "financial" or "finance" may be provided as entries in the second field of the first entry 610 of the user application library 600. The keywords may be provided by the user herself via a user application library input user interface (not shown), or by the user's supervisor or co-worker(s) who is familiar with projects that the user has been assigned in the past and will be assigned in the future. Alternatively or in concert therewith, the keywords may be provided based on historical data obtained from each employee working at the same company as the user. For example, other users may have performed finance projects using "EXCEL" in the last year, and as such, "finance" keyword may be provided in the second field for the EXCEL entry 610 for the user as well. In other implementations, information other than key words may be provided in the second field of each entry of the user application library, whereby that other information may include video images.

If the user has recently performed a database creation project using the PYTHON application, then the keywords "database" or "data" may be provided as entries in the second field of the second entry 620 of the user application library 600.

Returning back to FIG. 5, in step 570, the received email is analyzed (i.e., scanned or parsed) for content included in the received email, to determine if there is a match with any of the keywords stored in any of the entries of the user application library 600 (see FIG. 6). In step 580, a determination is made as to whether there is a key word match. The scanning may be performed by the XenMobile application, or by a character recognition application under control of the XenMobile application.

By way of example, consider the following email received by the user's computer:

FROM: Tony's Supervisor

TO: Tony

CONTENT: Hi, Tony. Please fill out the financial forecast for the quarterly AZURE spend items by the end of this week.

Based on scanning of the received email in step 570 and the key matching performed in step 580, the word "financial" is found, which matches "financial" in the first field of the first entry 610 of the user application library 600 as shown in FIG. 6. As such, the result of the key word match determination in step 580 is YES, and the application "EXCEL" in the first field of the first entry 610 of the user application library 600 is determined to be associated with a task to be performed by Tony based on the received email.

In some embodiments, in order to speed up the process and to lessen the load on computer processing resources, in the scanning of the email content performed in step 570, certain "filler" words (e.g., words of three characters or less)

in the received email may be skipped, such as "and", "or", "to", etc. In more detail, nouns and verbs within the received email may be determined using a language-based application to retrieve only important words from the received email to determine if there is a match to any of the key words stored in the user application library 600.

If there was no key word matching of the content within the received email with the key words in the user application library 600, then the result of the key word match determination in step 580 would be NO, and the process proceeds to step 586 in which preloading of an application is not performed on the user's home device.

If a key word match has been found (YES in step 580), then the process proceeds to step 588, whereby a link or icon associated with the application associated with the key word match is provided on a display of the user's home PC, home desktop, or smart phone. The link or icon provide a quick and easy-to-select way for the user to obtain the application needed to perform a task associated with the received email. By way of example, the link may be a hyperlink to a network address (i.e., Internet Protocol address, such as www.get_application_here.com) at which the application is currently stored. In some aspects, the application may be preloaded onto the user's home PC, home desktop, or smart phone via the XenDesktop application upon a key word match, whereby the user need only click on the link or icon displayed in a quick launch area of the display (i.e., on a bottom row of the display) in step 589. In some embodiments, upon a key word match, the application associated with the matched key word is copied from a hard drive onto a cache or other quickly accessible memory of a virtualization network computer (e.g., a server at a data center of the virtualization system), to thereby provide for a quick-as-possible transfer of the application to the user when the user requests that application.

Upon detection of a user selection of the link or icon on the quick launch area, in step 590, the application associated with the link or icon is provided to the user's home PC, home desktop, or smart phone via a network receiver function on the user device. That way, the user can then start working immediately on a project associated with the content in the received email, and does not have to be concerned with finding the appropriate application (via the XenDesktop application or on the user's home device) to perform a project or task described in the received email.

In alternative implementations in which received content by the user's home device is a text message or a video image, for example, the information in the second field for entries in the user's application library 600 shown in FIG. 6 may include one or more video images that are associated with particular applications in the respective first field for entries in the user's application library 600. For example, the first entry 610 may have a video image associated with a financial spreadsheet, for comparison with a text message and/or video image in content received by the user's home device from the user's supervisor, related to a task that the user is to perform. In these implementations, information other than key words may be stored in the second field of one or more entries of the user's application library 600.

While the above embodiment has been described with respect to a virtualization environment, in other embodiments, a user may be provided with a quick link or icon to launch an application that is stored on the user's home PC, home desktop, or smart phone, and whereby that application is not obtained from another location via a virtualization system using a cloud environment. Such a method is described below, with reference to the flow diagram 700 shown in FIG. 7. Again, similar to the method of FIG. 5 described above, the method of FIG. 7 is described with respect to the content being a received email. However, the content may be a text message or a video image, or any other received content, in alternative implementations, while remaining within the scope of the disclosure.

In step 710, the user's home device receives an email that is detected by an email application (e.g., XenMobile or OUTLOOK), and in step 720, the opening of the email is detected by the user's home device. In step 730, a user application library is obtained as a result of the detection of the opening of the email, whereby the user application library may be obtained from another computer accessed via the Cloud. In step 740, the user application library is populated with information associated with the user. For example, the user application library may include plural entries with key words associated with each application assigned to the user, whereby the key words may be provided based on historical information of a plurality of users who work at the same company as the user.

In step 750, the user application library obtained in step 740 is further populated based on key words provided by the user herself, to thereby supplement the historical data used to create the user application library with user-specified information.

In step 760, the received email is analyzed (i.e., scanned or parsed) for content, to determine if there is a key word match, and in step 770, a determination is made as to whether there is a key word match.

If a key word match is found (YES in step 770), then in step 780, a link or icon associated with the application associated with the key word match is provided on a display of the user device, such as on a quick launch area of the display, to provide an mechanism for the user to obtain the application quickly and efficiently. In some embodiments, the application associated with the key word match is preloaded onto the user's workspace on his home device, without requiring the user to engage the link or icon.

If there is not a key word match (NO in step 770), then in step 772 no further action is taken regarding preloading of an application onto the user's home device.

Upon detection of a user selection of the link or icon on the quick launch area, in step 790, the associated application is opened on the user's home PC, home desktop, or smart phone, so that the user can then start working on a project associated with the content in the received email. This enables the user to immediately start working on a project by opening the necessary application to perform a task, without having to find the necessary application by invoking the XenDesktop application and waiting for the application needed to be perform a task identified in the received email, to be uploaded from the virtualization system and made accessible to the user on the user's home device.

Figure 7:
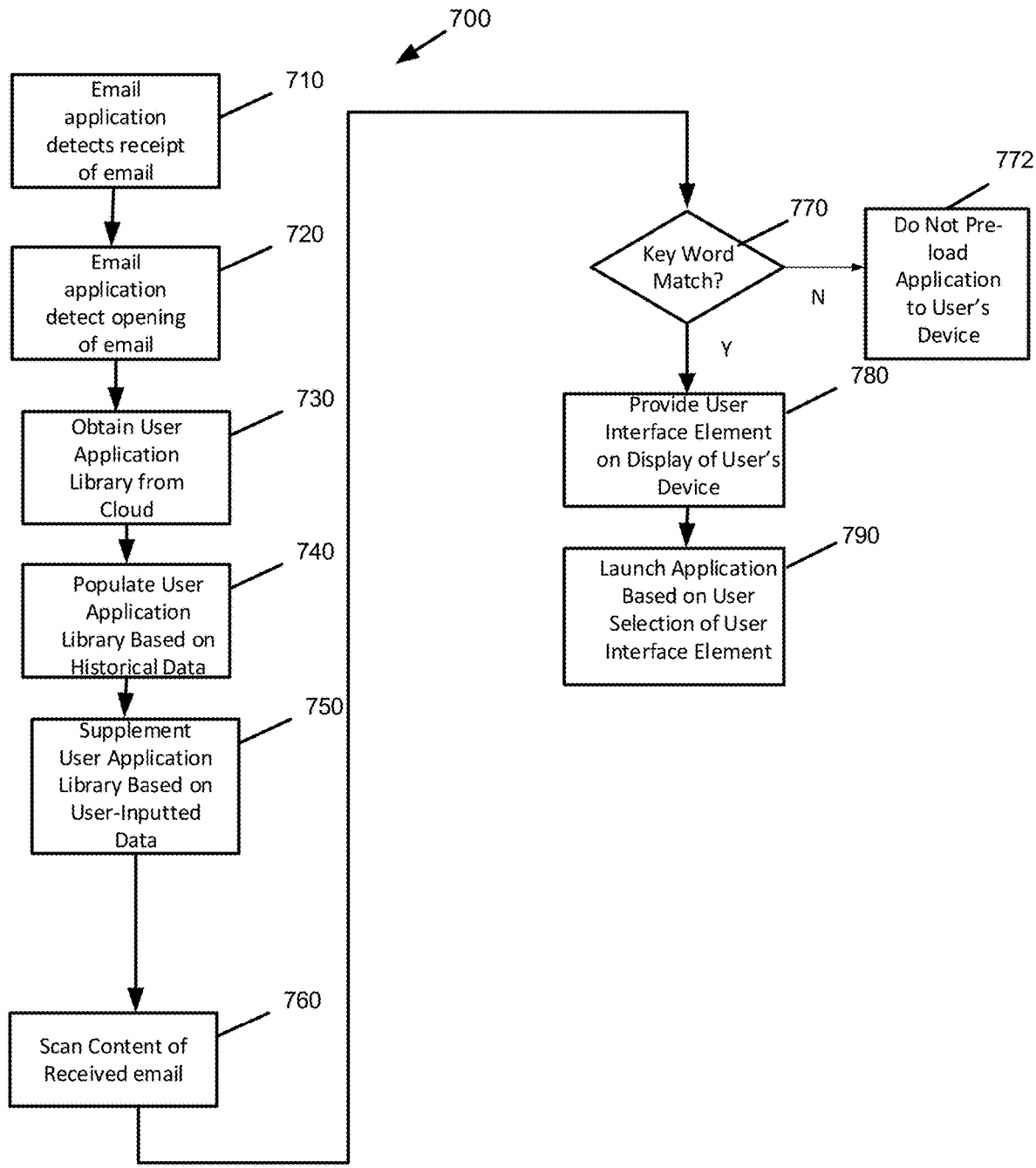
FIG. 7 depicts a flow diagram that illustrates another method that preloads an application to a user device based on information analyzed from content corresponding to a received email in a non-virtualization environment, in accordance with one or more illustrative aspects described herein.

In some embodiments, if there is a match of an entry in the user application library, but the application is not currently stored on the user's home device and is not obtainable via the XenDesktop application (that is, not available via the virtualization system), a link may be provided in step 589 of FIG. 5 and step 780 of FIG. 7 to a web page by which the user may download the application needed to perform a task associated with the received email. For example, if the user does not have access to VISIO, then a link may be provided to a MICROSOFT web page, to enable the user to download the needed VISIO application onto his/her home device. In the virtualization environment, if the user does not have rights to a particular application associated with a keyword that matches the content in the received email, then in some embodiments an email message may be automatically sent to an IT administrator, to request access to the needed application by the user via the XenDesktop application.

Figure 8:
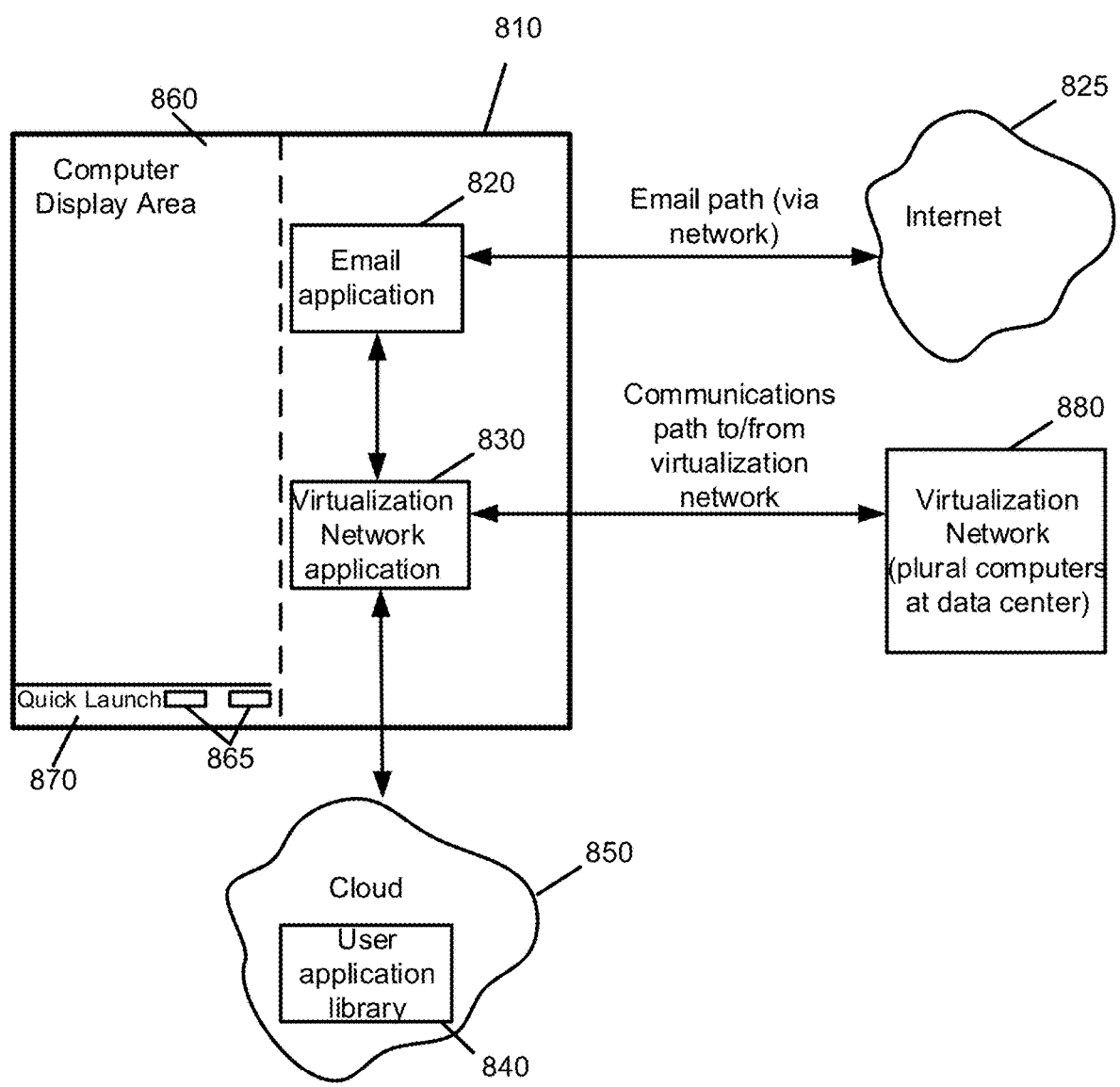
FIG. 8 depicts network elements for preloading an application to a user device based on information analyzed from content corresponding to a received email, in accordance with one or more illustrative aspects described herein.

FIG. 8 shows elements that may be used to provide an application to a user on a display of the user's device, according to one or more embodiments. A user device 810, which may be PC a desktop computer, or a smart phone, for example, includes an email application 820 (e.g., XenMobile application) and a virtualization network application 830 (e.g., XenDesktop application). The email application 810 detects receipt of an email via a network connection, such as a network connection to Internet 825, and notifies the virtualization network application 830 to fetch the user application library. The user application library 840 is stored in the Cloud 850, and is obtained by the virtualization network application 830, and populated with additional user-specific information (if such information is obtainable from the user device 810).

The virtualization network application 830 provides the user application library 840 to the email application 820, which scans the received email to determine if there are any matches to keywords stored in the user application library 840. If there is a match, then a display area 860 of the user device 810 provides a link or icon 865 in a quick launch area 870 of the display area 860, whereby an instance to the application associated with the matched key word is provided to the user device 810 upon selection by the user of the link or icon 865. The instance may be a link to a virtual machine of virtualization network 880 on which the desired application is stored.

As illustrated above, various aspects of the disclosure relate to providing access to an application to a user based on content within content received by the user's device. While the subject matter has been described in language specific to structural features and/or methodological acts, it is to be understood that the subject matter defined in the appended claims is not necessarily limited to the specific features or acts described above. For example, in the virtualization embodiments, when there is a match of a key word in the user application library with a word or words in a received email or a received text message, the process may first determine whether or not the application associated with the matched key word is currently loaded on the user's home device. If the associated application needed to perform a task described in a received email or the received text message (or is associated with a video image received by the user's home device) is currently loaded on the user's home device, then the XenDesktop application is not needed to obtain the associated application, and a user interface element provided on a display of the user's home device provides a mechanism for the user to readily open the associated application from a local memory (e.g., hard drive of the user's home device) and not via a virtualization system. If the associated application needed to perform a task described in the received email or the received text message (or is associated with a video image received by the user's home device) is not currently loaded onto the user's home device, then the user interface element provides a link to another computer by which the user's home device may retrieve that application via a virtualization system (e.g., using the XenDesktop application).

The specific features and acts described above are described as some example implementations of the following claims.

What is claimed is:

1. A method comprising:
receiving, by a user device, a first message satisfying one or more criteria, wherein the one or more criteria comprises a sender of the first message matching one of a predetermined plurality of senders;
sending, by the user device and to a first remote computing device via a network connection and based on the first message satisfying the one or more criteria, a request to receive a user application library comprising a plurality of key words and a plurality of application types accessible by the user device,
wherein each key word of the plurality of key words corresponds to an application type of the plurality of application types,
wherein each application type corresponds to an application stored at a second remote computing device;
receiving, by the user device and from the first remote computing device, the user application library;
determining, by the user device, that a body of the first message comprises a natural language word that matches a key word of the plurality of key words of the user application library; and
in response to determining that the first message comprises a natural language word that matches a key word of the plurality of key words of the user application library, providing, on a quick launch area depicted on a display of the user device, a user interface element that, responsive to user input, launches the application type associated with the key word, wherein the quick launch area is separate from a display area in which the first message is displayed.

2. The method of claim 1, further comprising:
receiving, by the user device, an application corresponding to an application type associated with the key word,
wherein the application is received from the second remote computing device by way of a network connection between the user device and the second remote computing device.

3. The method of claim 2, wherein, data is transmitted, via the application, between the user device and the second remote computing device.

4. The method of claim 1, wherein the first message comprises one of an email or a text message.

5. The method of claim 1, wherein the user interface element comprises an icon displayed on the display.

6. The method of claim 5, wherein the icon is provided in a bottom row of the display corresponding to the user interface element.

7. The method of claim 1,
wherein the user input causes creation, by the second remote computing device associated with the user device by way of a network connection, of a document corresponding to the application type,
wherein the document is capable of being stored at the user device.

8. The method of claim 1, further comprising:
determining that a second message received by the user device does not satisfy the one or more criteria; and
in response to determining that the second message does not satisfy the one or more criteria, disabling access to the second message.

9. The method of claim 1, wherein the first message comprises an email, and wherein the one or more criteria further comprises:
each sender of the predetermined plurality of senders corresponds to an email address associated with an email address of a user of the user device; and an attachment associated with the email corresponds to a document type of a plurality of document types stored in a document type database accessible by the user device.

10. The method of claim 1, further comprising:
receiving, by way of a user interface provided to the user device, additional key words for one or more application types of the plurality of application types accessible by the user device; and
generating, by the user device, a new user application library comprising the plurality of key words, the additional key words, and the plurality of application types accessible by the user device.

11. The method of claim 1, further comprising:
receiving, by the user device, a second message, wherein the user device determines that a second predetermined plurality of senders, stored by the user device, comprises a sender of the second message; and
disabling, by the user device and based on the determining that the second predetermined plurality of senders comprises the sender of the second message, access to the second message.

12. The method of claim 1, further comprising:
preloading, on the user device and based on the key word, an application corresponding to the application type.

13. An apparatus comprising:
one or more processors; and
a memory storing instructions that, when executed by the one or more processors, cause the apparatus to:
receive a first message satisfying one or more criteria, wherein the one or more criteria comprises a sender of the first message matching one of a predetermined plurality of senders;
send, to a first remote apparatus via a network connection and based on the first message satisfying the one or more criteria, a request to receive a user application library comprising a plurality of key words and a plurality of application types accessible by a user device,
wherein each key word of the plurality of the plurality of key words corresponds to an application type of the plurality of application types,
wherein each application type corresponds to an application stored at a second remote apparatus;
receive, from the first remote apparatus, the user application library;
determine that a body of the first message comprises a natural language word that matches a key word of the plurality of key words of the user application library; and
in response to determining that the first message comprises a natural language word that matches a key word of the plurality of key words of the user application library, provide, in a quick launch area depicted on a display of the apparatus, a user interface element that, responsive to input, launches the application type associated with the key word, wherein the quick launch area is separate from a display area in which the first messaqe is displayed.

14. The apparatus of claim 13, further comprising:
receiving, by the apparatus, an application corresponding to the application type,
wherein the application is received from the second remote apparatus by way of a network connection between the apparatus and the second remote apparatus.

15. The apparatus of claim 14, wherein the instructions, when executed by the one or more processors, further cause the apparatus to:
receive, by way of a user interface provided to the apparatus, additional key words for one or more of the plurality of application types accessible by the apparatus; and
generate, by the apparatus, a new user application library comprising the plurality of key words, the additional key words, and the plurality of application types accessible by the apparatus.

16. The apparatus of claim 13, wherein the first message comprises one of an email or a text message.

17. The apparatus of claim 14, wherein, upon selection by a user of the application type via the user interface element provided on the display of the apparatus, the application corresponding to the application type that is stored on the second remote apparatus is provided to the apparatus.

18. The apparatus of claim 13, wherein the user interface element comprises an icon, wherein the icon is provided in a bottom row of the display corresponding to the user interface element.

19. The apparatus of claim 13, wherein the first message comprises an email, and wherein the one or more criteria further comprises:
each sender of the predetermined plurality of senders corresponds to an email address associated with a user; and
an attachment associated with the email corresponds to a document type of a plurality of document types stored in a document type database accessible by the apparatus.

20. The apparatus of claim 13, wherein the instructions, when executed by the one or more processors, further cause the apparatus to:
receive a second message, wherein the apparatus determines that the second message comprises an attachment that may contain a virus; and
disable, based on the determining that the second message comprises an attachment that may contain a virus, access to the second message.

21. The apparatus of claim 13, wherein the instructions, when executed by the one or more processors, further cause the apparatus to:
preload, based on the key word, an application corresponding to the application type.

22. A system comprising:
a first apparatus;
a remote second apparatus; and
a remote third apparatus,
wherein the first apparatus comprises:
one or more processors; and
a memory storing instructions that, when executed by the one or more processors, cause the first apparatus to:
receive a first message satisfying one or more criteria, wherein the one or more criteria comprises a sender of the first message matching one of a predetermined plurality of senders;
send, to the remote second apparatus via a network connection and based on the first message satisfying the one or more criteria, a request to receive a user application library comprising a plurality of key words and a plurality of application types accessible by a user device, wherein each key word of the plurality of key words corresponds to an application type of the plurality of application types, wherein each application type corresponds to an application stored at the remote third apparatus;

receive, from the remote second apparatus, the user application library;

determine that a body of the first message comprises a natural language word that matches a key word of the plurality of key words of the user application library; and in response to determining that the first message comprises a natural language word that matches a key word of the plurality of key words of the user application library, provide, in a quick launch area on a display of the first apparatus, a user interface element that, responsive to input, launches the application type associated with the key word, wherein the quick launch area is separate from a display area in which the first message is displayed, wherein the application corresponding to the application type associated with the key word is accessible by the first apparatus operating as a virtual machine executing the application stored at the remote second apparatus.

23. The system of claim 22, wherein the instructions, when executed by the one or more processors, further cause the first apparatus to:

preload, based on the key word, an application corresponding to the application type.

* * * * *